US006208255B1

(12) United States Patent
Conrad et al.

(10) Patent No.: US 6,208,255 B1
(45) Date of Patent: Mar. 27, 2001

(54) NON-RESONANT ELECTROMAGNETIC ENERGY SENSOR

(76) Inventors: Larry M. Conrad, 20981 120th Ave., Delta, IA (US) 52550; Robert J. Weber, 1160-115th Rd., Boone, IA (US) 50036

( * ) Notice: Subject to any disclaimer, the term of this patent is extended or adjusted under 35 U.S.C. 154(b) by 0 days.

(21) Appl. No.: 09/421,670

(22) Filed: Oct. 20, 1999

(51) Int. Cl.$^7$ .................................................. G08B 21/00
(52) U.S. Cl. ......................... 340/606; 340/684; 111/903
(58) Field of Search .................................. 340/606, 674, 340/684; 111/100, 200, 903

(56) References Cited

U.S. PATENT DOCUMENTS

| | | |
|---|---|---|
| 4,137,529 | 1/1979 | Anson et al. . |
| 4,239,010 | 12/1980 | Amburn . |
| 4,246,469 | 1/1981 | Merlo . |
| 4,268,825 | 5/1981 | Kaplan . |
| 4,333,096 | 6/1982 | Jenkins et al. . |
| 4,710,757 | 12/1987 | Haase . |
| 5,092,819 | 3/1992 | Schroeder et al. . |
| 5,644,244 | 7/1997 | Marrelli et al. . |
| 5,686,671 | 11/1997 | Nelson et al. . |
| 5,708,366 | 1/1998 | Nelson . |
| 5,716,272 | 2/1998 | Nelson . |

Primary Examiner—Edward Lefkowitz
(74) Attorney, Agent, or Firm—Henderson & Sturm LLP

(57) ABSTRACT

A non-resonant electromagnetic energy sensor which generates output signals upon the quantitative and/or qualitative detection of the flow of various substances including solid particles flowing as discrete individual particles or as a continuum, as well as the flow of liquids and/or gaseous substances. The non-resonant electromagnetic energy sensor may be interfaced with various types of electronic circuitry whereby the generated output signals may be used for monitoring a variety of flowing substances, for example, seed flow in an agricultural planter, crop yield on a combine harvester, and flow rates of liquids or gaseous fluids through conduits. The sensor comprises a housing having wall members defining a chamber having an interior volume. The sensor is designed to be interposed along a length of conduit through which the material or substance to be analyzed will pass. An electromagnetic energy source and an electromagnetic energy detector are in communication with the interior volume of the chamber. The electromagnetic energy source propagates non-resonant electromagnetic energy of a predetermined frequency and amplitude into a measuring region within the interior volume of the chamber. The electromagnetic energy detector detects the signal variations of the electromagnetic energy within the measuring region caused by the perturbation of the electromagnetic energy field due to the passage of the analyte therethrough and responds to these signal variations by generating output signals. These output signals may then be received by electronic circuitry designed for particular monitoring needs interfaced therewith.

21 Claims, 8 Drawing Sheets

NON-RESONANT ELECTROMAGNETIC ENERGY SENSOR

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates generally to sensors utilizing electromagnetic energy for detecting the passage of substances through a chamber, and more particularly to such sensors in which said electromagnetic energy is non-resonant.

2. Description of the Related Art

Sensors which use electromagnetic energy for detecting the passage of a substance through a chamber are well known in the art and have found applications in a number of industries. For example, in the agricultural industry, electromagnetic sensors have been used for monitoring seed planting operations as disclosed in U.S. Pat. No. 4,246,469 to Merlo, and for monitoring crop moisture as disclosed in U.S. Pat. No. 5,708,366 to Nelson. In the petroleum industry, sensors using electromagnetic energy have been used for determining solid-to-liquid ratios in a flowing petroleum stream as disclosed in U.S. Pat. No. 5,644,244 to Marrelli et al.

Unfortunately, the inventions disclosed in these patents fail to solve the need of providing a single sensor that can be used for detecting the presence, flow-rate, and/or volume of various substances, whether the substance being measured is a solid, a liquid, or a gaseous material such that only one sensor is needed for all the monitoring needs of a user. Nor do these sensors provide for both quantitative and qualitative detection of substances. Thus, those concerned with these and other deficiencies recognize the need for an improved electromagnetic energy sensor.

BRIEF SUMMARY OF THE INVENTION

A non-resonant electromagnetic energy sensor which generates output signals upon the quantitative and/or qualitative detection of the flow of various analyte substances including solid particles flowing as discrete individual particles or as a continuum, as well as the flow of liquids and/or gaseous analyte substances. The non-resonant electromagnetic energy sensor may be electronically interfaced with various types of electronic circuitry whereby the generated output signals may be used for monitoring a variety of flowing substances, for example, seed flow in an agricultural planter, crop yield on a combine harvester, and flow rates of liquids or gaseous fluids under pressure.

The sensor comprises a housing having wall members defining a chamber having an interior volume. The sensor is designed to be interposed along a length of conduit through which the analyte will pass. An electromagnetic energy source and an electromagnetic energy detector are in communication with the interior volume of the chamber. The electromagnetic energy source propagates non-resonant electromagnetic energy of a predetermined frequency and amplitude into a measuring region within the interior volume of the chamber. The electromagnetic energy detector detects the signal variations of the electromagnetic energy within the measuring region caused by the perturbation of the electromagnetic energy field due to the passage of the analyte therethrough and responds to these signal variations by generating output signals. By interfacing various types of electronic circuitry to receive these output signals, the non-resonant electromagnetic energy sensor may be used to quantitatively and/or qualitatively detect the analyte, whether the analyte is a solid flowing as discrete particles or as a continuum, or whether the analyte is a flowing liquid, or flowing gaseous substance.

Other objects, advantages, and novel features of the present invention will become apparent from the following detailed description of the invention when considered in conjunction with the accompanying drawings.

DETAILED DESCRIPTION OF THE INVENTION

Figure 1:
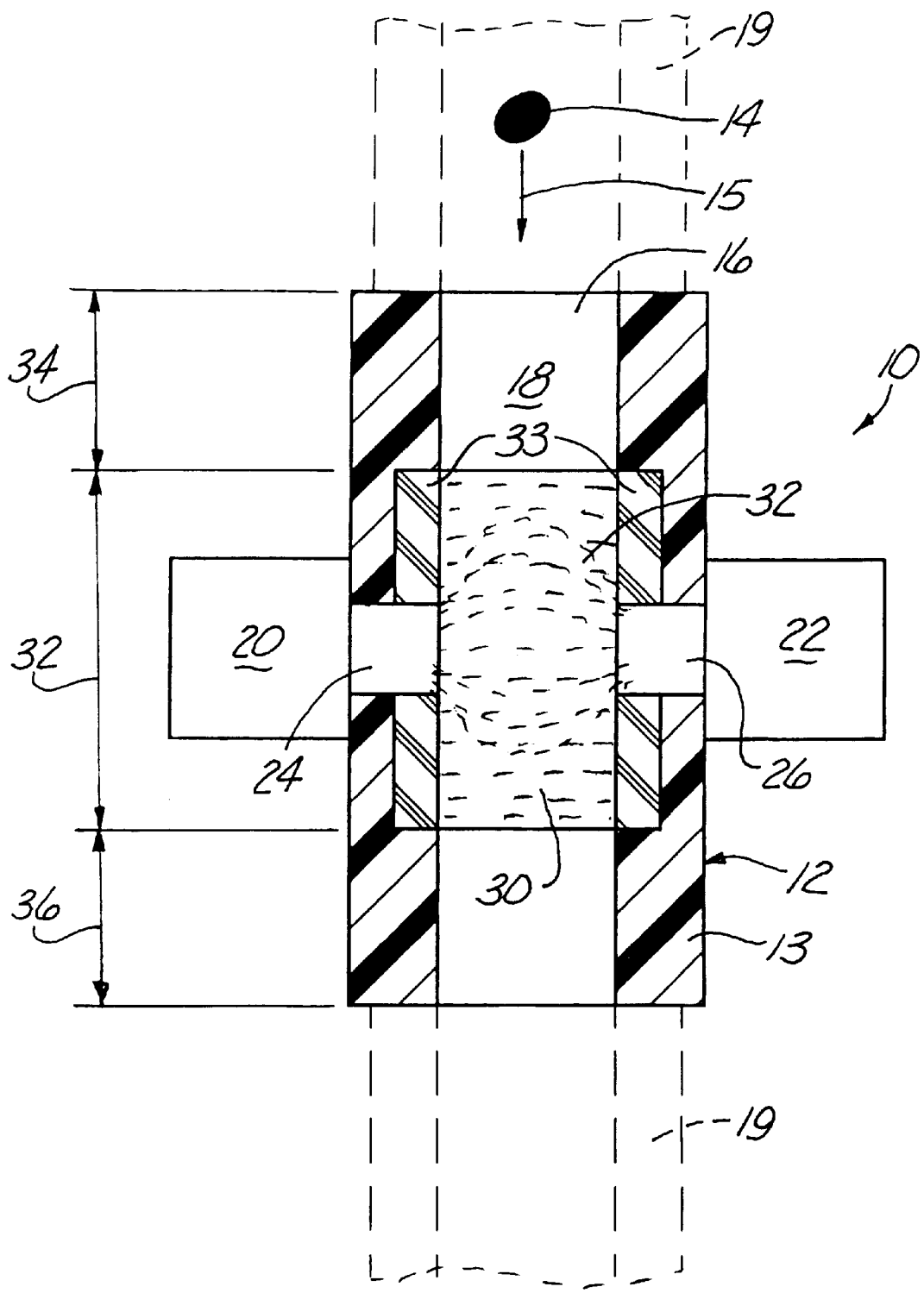
FIG. 1 is a cross-sectional view of one embodiment of the non-resonant electromagnetic energy sensor of the present invention interposed along a length of conduit.

Referring now to the drawings, wherein like reference numerals designate identical or corresponding parts throughout the several views, FIG. 1 shows a cross-sectional view of one embodiment of the non-resonant electromagnetic energy sensor (10) of the present invention. In the FIG. 1 embodiment, the sensor (10) comprises a housing (12) having wall members (13) defining a chamber (16) having an interior volume (18). The sensor (10) is designed to be interposed along a length of conduit (19) through which the material or substance to be analyzed (hereinafter referred to as the analyte (14)) will pass, represented by arrow (15), and thus, at least a portion of the interior volume (18) is also disposed along the path of travel of the analyte (14) passing through the conduit (19). An electromagnetic energy source (20), and an electromagnetic energy detector (22) are in communication with the interior volume (18) of the chamber (16) through input and output ports (24, 26), respectively, disposed in the wall members (13) of the chamber (16). As will be discussed in further detail later, the electromagnetic energy source (20) propagates electromagnetic energy (30) of a predetermined frequency and amplitude into the interior volume (18) of the chamber (16) through the input port (24). The electromagnetic energy detector (22), in communication with the interior volume (18) of the chamber (16) through the output port (26), responds to signal variations of the electromagnetic energy (30) therein caused by the perturbation of the electromagnetic energy field (30) due to the passage of the analyte (14). It should be understood that all materials have material parameter values as determined by the material's permittivity, permeability, and conductivity properties. These relate to the material's dielectric, magnetic and conductive properties respectively. Thus, as the analyte (14), passes through an electromagnetic energy field (30), the electromagnetic energy signal will perturb (i.e. vary). It is this variation in the electromagnetic energy signal, which the present invention detects and utilizes by generating output signals for use in various applications as will be discussed in detail later.

In one preferred embodiment, a portion of the chamber (16) preferably includes a measuring region (32) disposed between an evanescent upper region (34) and an evanescent lower region (36) of the chamber (16). The wall members (33) of the measuring region (32) are comprised of a dielectric material such as polymer, ceramic, or any other suitable dielectric material. The dielectric material makes the measuring region (32) of the chamber (16) significantly "electromagnetically larger" in cross-section than the evanescent upper and lower regions (34, 36) of the chamber (16). Thus, as illustrated in FIG. 1, the above region (34) and the below region (36) act as waveguides which "cut-off" the electromagnetic energy (30) and confine it within the measuring region (32), such that the amount of electromagnetic energy (30) that can propagate out of the measuring region (32) is limited. The measuring region (32) thereby defines a region within the chamber (16) substantially filled with electromagnetic energy (30). It should be understood that "waveguide" as used in this specification, means any structure that guides electromagnetic energy regardless of wavelength.

The frequency and amplitude of the electromagnetic energy (30) propagated into the measuring region (32) may vary from application to application and depends on such factors as the size of the analyte (14) to be detected, which may dictate the desired internal diameter of the measuring region (32). Other factors which may effect the frequency and amplitude of the electromagnetic energy (30) might include the expected velocities of the analytes flowing through the chamber, the number of particles expected to pass through the chamber per unit of time, and available space due to design considerations of the equipment on which the material sensor (10) is placed. For example, if the conduit (19) is circular in cross-section, the internal diameter of the measuring region (32) is dictated by the following equation:

$$D < \frac{1.8412 v}{\pi f \sqrt{\varepsilon_r} \sqrt{u_r}}$$

D=internal diameter of the measuring region (32) (inches)
v=velocity of light (inches/sec)
f=frequency of the electromagnetic energy source (20) (Hz)
$\varepsilon_r$=effective dielectric constant of the analyte (14) and measuring region (32)
$u_r$=effective relative permeability of the analyte (14) and measuring region (32)

For example, assuming the frequency of the electromagnetic energy (30) from the electromagnetic energy source (20) is 10 GHz, and that the analyte (14) is dry sand having an assumed dielectric constant of 4, the internal diameter of the measuring region (32) would have to be less than 0.345 inches. At the same frequency (i.e. 10 GHz), if the analyte (14) is water having a dielectric constant of 80, the resulting internal diameter of the measuring region (32) would have to be less than 0.23 inches. Naturally, different electromagnetic energy source frequencies could be used for different applications, with lower frequencies being used if the internal diameter of the measuring region (32) needs to be larger for a particular application.

If interference to radio sets from any small leakage of electromagnetic energy (30) from the chamber (16) is of concern in a particular application of the material sensor (10) of the present invention, those skilled in the art will recognize that slight modifications of the material sensor (10) can be made to move the operating frequency of the electromagnetic energy (30) to one of the ISM bands to limit such interference. Additionally, if multiple sensors (10) of the present invention are to be used in close proximity in a particular application, those skilled in the art will recognized that various modulation formats could be used with the electromagnetic energy source (20) to enhance the signal-to-noise ratio to reduce mutual interference from adjacent sensors (10).

It should be appreciated that although the preferred embodiment discloses the use of a separate electromagnetic energy source (24) and detector (26), it is possible that a single component such as a Gunn diode acting as both the energy source and detector and may be used in the present invention. Accordingly, if such a device is used, only one port through the wall members (13) of the chamber (16) would be necessary. This single port would then act as both the input port (24) and the output port (26).

Figure 2:
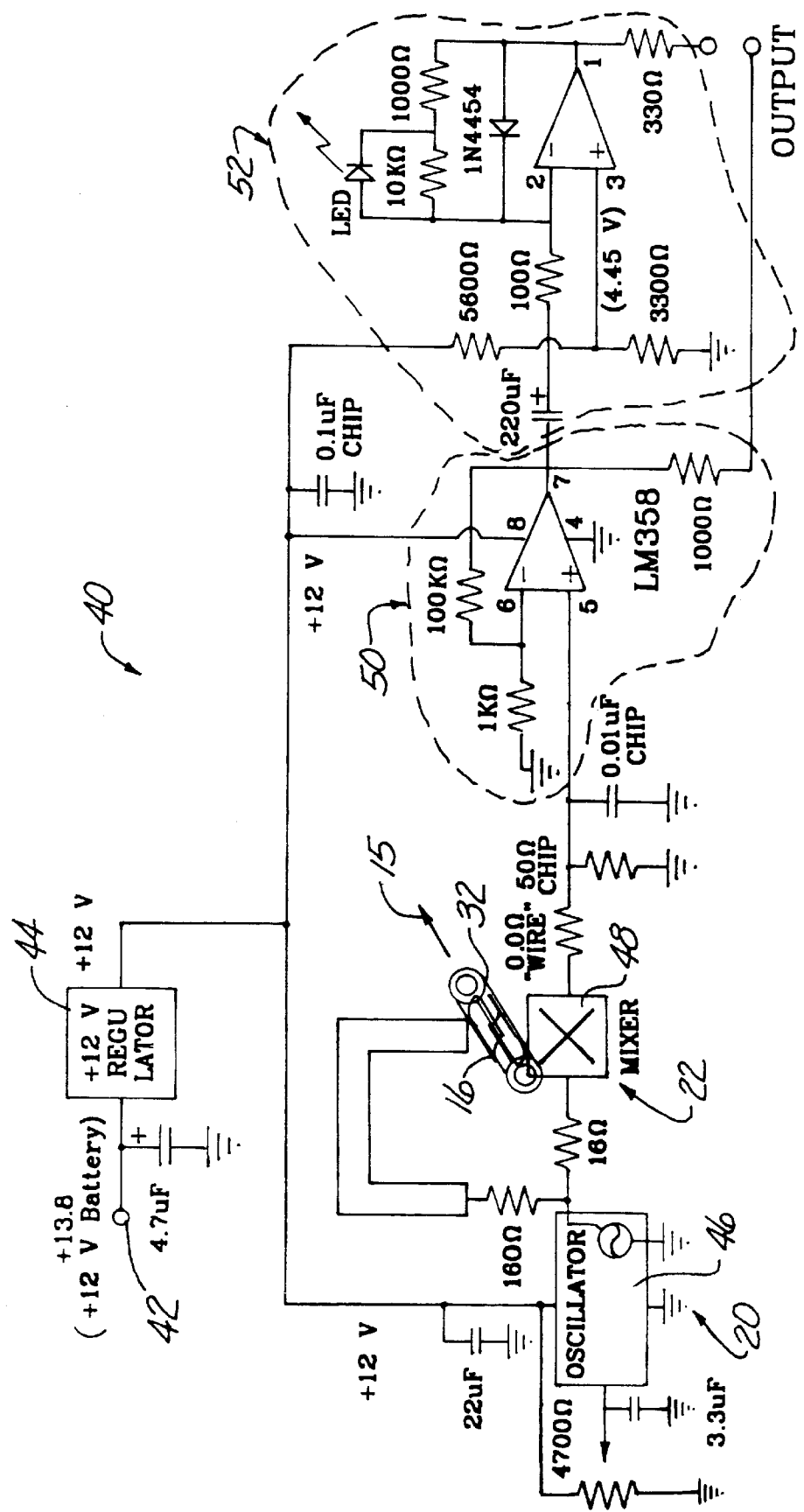
FIG. 2 is a schematic diagram of the preferred electronic circuitry for the non-resonant electromagnetic energy sensor.

FIG. 2 is a schematic diagram of the preferred electrical circuit (40) for the material sensor (10) of the present invention. The main electrical components of the electrical circuit (40) preferably includes a voltage source (42), a voltage regulator (44), an electromagnetic energy source (20) (such as an oscillator (46)) an electromagnetic energy detector (22) (such as a mixer (48)), a buffer amplifier (50) and a signal processor (52).

The voltage source (42) is preferably a 12 volt DC battery. Together, the voltage source (42) and the voltage regulator (44) provide constant voltage to the circuit (40). The preferred oscillator (46) for generating the electromagnetic energy (30) for propagation into the measuring region (32) of the chamber (16) is a Mini-Circuits POS 1025 operating in the 800 MHZ range and having a power output of 9 dBm. The preferred mixer (48) for detecting the electromagnetic energy signal variations is a Mini-Circuits ASK-2-KK81.

It should be understood that the electromagnetic energy (30) generated by the source (20) is comprised of both electrical and magnetic components having non-equal total peak values. Thus, the electrical circuit (40) is referred to as "non-resonant" electromagnetic energy circuit.

Before discussing the operation of the sensor (10) of the present invention, a brief discussion of electromagnetic energy and resonance circuits is helpful to the understanding of the present invention:

Resonance circuits can be characterized by considering what happens to energy in a volume under consideration. For the purposes of this brief discussion, the volume under consideration is comprised of a first volume which exists between a reactanceless source sending energy into the volume under consideration, and a reactanceless detector receiving energy from the volume under consideration (the reactance of the source and of the detector is considered part of the volume under consideration). The volume under consideration is also comprised of a second volume which includes those volumes connected electromagnetically to the first volume in a manner such that a change in the energy levels of the second volume substantially effects the response existing between the source and detector in the first volume.

It is understood that an electromagnetic source can absorb energy as well as send energy. This action is often described in terms of scattering parameters. For purposes of this brief discussion, we will consider the net amount of energy delivered from the source as the amount sent minus the amount absorbed. A detector of the energy will absorb some energy from the volume. This amount of energy absorbed by the detector can be considered as part of the energy lost in the volume. The resistance associated with the source can also be considered to be part of the energy absorbed or lost in the volume. This analysis is in the frequency domain. We will use a single frequency to discuss a response. If the characteristics of the volume, the source, and the detector are linear, it is well known that analysis for different types of signals can be obtained by superposition. One type of superposition is that obtained from Fourier transformation.

The energy in the volume consists of magnetic and electric energy. If there were no other losses, all the energy generated by the source in the steady state would be dissipated by the losses associated with the volume. (Keep in mind that the losses associated with the detector have been incorporated into the volume.) In the steady state, for a continuous wave (cw) signal, the magnetic energy and the electric energy in the volume change with time in a sinusoidal manner. The total amount of electric energy in the volume at any one instance of time is equal to the volume integral of the electric field energy at that time. The characteristics of the medium in the volume is described by the permittivity $\epsilon=\epsilon'-j\epsilon''$, the permeability $\mu=\mu'-j\mu''$, and the conductivity $\sigma$. The time average of the electric field energy is:

$$\overline{We} = \frac{1}{2}\int\int\int \epsilon'|E|^2 dV$$

where the integral is taken over the whole volume. This integral is for media for which $D=\epsilon E$. Since E varies with time sinusoidially (we assumed a sinusoidal variation with time), the energy varies from zero to a peak value twice during one cycle of the sinusoid. Likewise, the time average magnetic field energy in the volume is:

$$\overline{Wm} = \frac{1}{2}\int\int\int \mu'|H|^2 dV$$

and again the integral is taken over the whole volume. This integral also varies from zero to a peak value twice during one cycle. When the volume is at resonance, the peak values of energy are equal. The time average power dissipated in the medium is:

$$\overline{P_d} = \int\int\int ((\sigma + \omega\epsilon'')|E|^2 + \omega\mu''|H|^2) dV$$

When the time average of the electric field energy is the same as the time average of the magnetic field energy, the volume is said to be in resonance. The source supplies the average power dissipated and the reactive energy is cycled back and forth between the magnetic and electric energy. Since the total energy must be conserved, at resonance, when the electric energy is at its peak, the magnetic energy will be zero and vice versa. Note that at resonance, since the time average of the field energies are the same, the peak values are also the same. They just peak at different times.

The concept of equality of magnetic field energy and electric field energy at resonance will be demonstrated by considering a series RLC circuit. Assume that the voltage across the capacitor is $V_c=A\cos(\omega t)$. The current through the series circuit is then $I_c=-C_a\omega A\sin(\omega t)$. The electric field energy is equal to $(\frac{1}{2})CV^2$. The magnetic field energy is equal to $(\frac{1}{2})LI^2$. Since cosine peaks ninety degrees out of phase with sine, the capacitive energy peaks when the inductive energy is zero and vice versa. Since the energies are related to voltage or current squared, there are two peaks of energy per cycle. For example, when the voltage across the capacitor is maximum at A, the energy is related to A times A or $A^2$. When the capacitor voltage is considered one hundred eighty degrees later, the voltage is −A. The energy is related to −A times −A or again $A^2$. Completing the analysis, the capacitive energy is:

$$\frac{1}{2}CV^2 = CA^2\cos^2(\omega t)$$

and the inductive energy is:

$$\frac{1}{2}LI^2 = \frac{1}{2}C(LC\omega^2)A^2\sin^2(\omega t)$$

The resonance condition for the series RLC circuit is $\omega^2 LC=1$. At resonance the inductive energy is:

$$\frac{1}{2}LI^2 = \frac{1}{2}(1)CA^2\sin^2(\omega t)$$

This has the same magnitude as the capacitive energy. Similar relationships hold for field energies integrated over the volume. When the series RLC is not resonant, i.e. $\omega^2 LC$ is not equal to one, the peaks of magnetic and electric (inductive and capacitive) energy are still in the same time relationship but their peak values are different.

Operation of the Non-Resonant Electromagnetic Energy Sensor

In operation, as explained briefly above, when the resonant frequency of the electromagnetic energy (30) is above the measuring frequency, and when the analyte (14) passes through the measuring region (32) of the chamber (16), if the analyte (14) is a dielectric analyte material, the dielectric analyte material (14) will perturb the electromagnetic energy (30) within the measuring region (32) by increasing the electric field energy such that the total peak value of the electric field energy component approaches the total peak value of the magnetic field energy component, thereby causing the electromagnetic energy (30) to move closer to resonance. Likewise, if the analyte (14) is a magnetic analyte material, the magnetic analyte material (14) will perturb the electromagnetic energy (30) within the measuring region (32) thereby increasing the magnetic field energy such that the total peak value of the magnetic field energy component approaches the total peak value of the electric field energy component, thereby causing the electromagnetic energy (30) to move closer to resonance. As the electromagnetic energy (30) within the measuring region (32) moves closer to resonance, a larger signal variation is detected by the mixer (48) than is normally detected when the electromagnetic energy (30) is farther from resonance or at resonance. When the mixer (48) detects this increase in signal variation, it produces a dc output signal which is then amplified and processed by the buffer amplifier (50) and signal processor (52) respectively.

By interfacing this output signal from the mixer (48) to a monitor or other various types of electronic circuitry, such as by electrical, magnetic or photoelectic coupling, the material sensor (10) may be used for detecting not only the presence or passage of solid, liquid and/or gaseous materials through the conduit (19), but also for quantitative and/or qualitative determinations of those materials or substances. For the purpose of defining specific embodiments, examples of such applications are discussed in detail below.

Specific Embodiments of Possible Applications of the Material Sensor

1. Flow or No-Flow Monitoring

The above described material sensor (10) may be used, for example, on a conventional multi-row planter for detecting the flow, or interruption thereof, of seed, fertilizer, insecticide, herbicide, etc., through the conduits of the planter.

Figure 3:
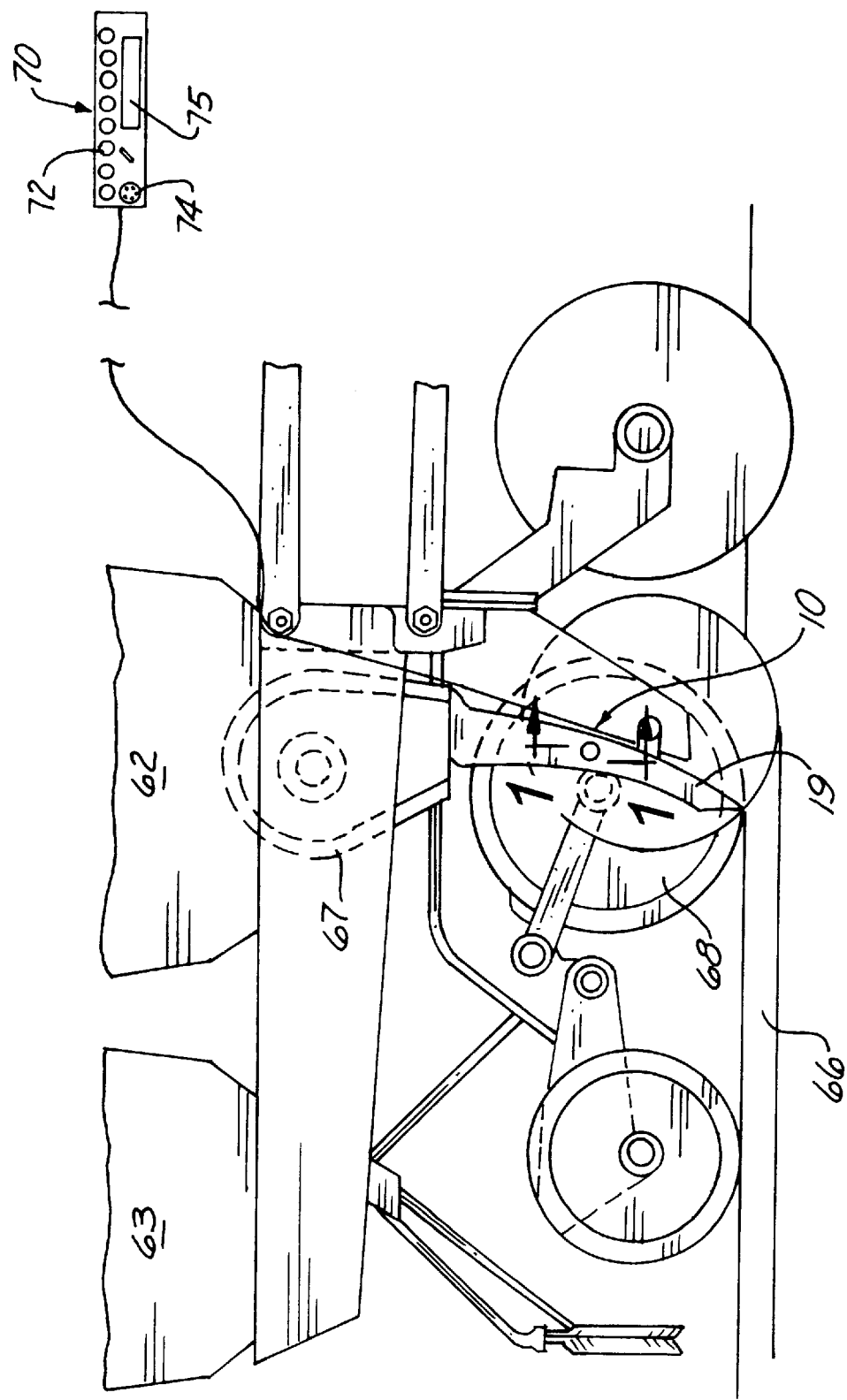
FIG. 3 is a side elevation view of a planter showing one application for use of the non-resonant electromagnetic energy sensor of the present invention.

Referring to FIG. 3, a conventional multi-row planter (60) is shown. It should be understood that the following discussion of the components comprising a conventional multi-row planter and its operation may vary among the different makes and models of such planters, but all such planters are substantially similar in their structural components and operation. The planter (60) includes a plurality of seed hoppers (62), one for each row, to hold and dispense the seed as the planter (60) traverses the field. Each row also typically includes one or two other hoppers (63) for dispensing fertilizers, herbicides and/or insecticides along with the seed. For clarity and ease of discussion, however, the following description will focus only the structure for dispensing seed. A conduit (19) attached to and disposed below each hopper (62) defines a path for the seed to travel through to the soil (66) to be planted. Disposed at the base of the hopper (62) or at the interface of the hopper (62) and conduit (19) is a metering device (67) which ideally passes the seed, one at a time, into the conduit (19). The metering device (67) is typically comprised of a rotating metering wheel interconnected through chain drives (not shown) with the press wheel (68) of the planter (60) such that rotation of the press wheel (68) causes rotation of the metering wheel to dispense the seeds. Other types of metering devices (67) may utilize positive and negative air pressures to dispense the seed into the conduit (19) depending on the make and model of the planter.

Referring back to the cross-sectional view of FIG. 1, which is, for example taken, along lines 1—1 of FIG. 3, the material sensor (10) is shown interposed in the conduit (19) along the path of travel of the analyte (14) (i.e. the seed). The internal diameter of the measuring region (32) of the chamber (16) of the sensor (10) is preferably the same diameter as the conduit (19) above and below the measuring region (32) such that the seed (14) can pass through the measuring region (32) without obstruction. As discussed previously, the electromagnetic energy source (20) and the electromagnetic energy detector (22) are in communication with one another through their respective input and output ports (24, 26). As the seed (14) passes through the elecromagnetic energy field (30) within the measuring region (32), the electromagnetic energy (30) is perturbed by the presence of the seed (14), causing the magnetic and electric field energy peak values to be brought closer to resonance (i.e. approach equality as previously discussed). The detector (22) (FIG. 2) detects this increase in signal variation and produces an electrical signal output response as discussed above which can be utilized by various types of planter consoles or monitors (70) (FIG. 3) currently available and in common use by farmers with their planters.

By electrically, magnetically or photoelectically coupling the signal output of the material sensor (10) with the electronic circuitry of a planter console or monitor (70), visual and audible indication of the seed flow, or lack thereof through each conduit (19) of the planter (60) may be had. Such a console (70) is typically mounted within the cab of the tractor (not shown) pulling the planter (60). One type of such a commercially available console or monitor (70) is a DJ 2100 as manufactured by Dickey-John™. The console (70) preferably comprises a plurality of indicator lamps (72) corresponding to each row of the planter (60). The indicator lamps (72) or other indicator means are responsive to the electrical output signals generated by the material sensor (10) to cause the lamps (72) to flash each time a seed passes through the measuring region (32) of sensor (10) interposed in the conduit (19). The operator will thereby have visual indication of the passage of seed through all of the conduits (19) whose associated rows are being planted. In addition to the indicator lamps (72), the console (70) may also include an alarm (74) which sounds when the sensors (10) do not detect seed flow within a predetermined time interval. Thus, if the operator fails to notice that a particular indicator lamp (72) is not flashing, and therefore no seed is being planted in that row, an audible alarm will warn the operator that a particular row is not being planted—which may be the result of an empty seed hopper (62), an obstruction blocking seed flow through the conduit (19), or possibly a faulty seed metering device.

In addition to merely detecting the flow of seed, or lack thereof, farmers also prefer to know the seed population, typically designated in seeds per acre. One way of obtaining seed population, is to determine the amount of seed planted per unit of distance traveled by the planter (60). Thus, if the electronic circuitry of the console (70) is already recording the total number of seeds being planted as described above, a simple calculation familiar to those skilled in the art will readily obtain seed population if the speed and/or distance traveled by the planter (60) is also being monitored. Most monitors or consoles (70) available on the market will track the speed and/or distance traveled by the planter (60) and therefore seed population can be readily obtained. Consoles

(70) with associated circuitry able to calculate and display seed population are disclosed in references such as U.S. Pat. Nos. 4,137,529; 4,268,825; 4,333,096; and 4,710,757, the specifications of which are incorporated herein by reference.

2. Particle Counting

In addition to merely detecting the presence of an analyte (14) passing through the measuring region (32), the sensor (10) of the present invention may also perform qualitative and quantitative analysis on the analyte (14) during passage through the measuring region (32).

A practical use of such qualitative and quantitative analysis of an analyte (14) can again be found in the example of the seed planter (60) of FIG. 3. It should be appreciated that the accuracy of the seed monitors (70) as described above is dependent upon the ability of the material sensor (10) to distinguish between dirt, dust, chaff and seed fragments, and those whole seeds which will germinate into a plant. Additionally, during high rates of seed flow or when variation in seed sizes cause two or more seeds to drop at the same time (doubles), the material sensor (10) must be able to distinguish the seeds so that doubles are not counted as one. Further, the material sensor (10) must also be sensitive to moisture in order to distinguish good seed from bad seed so that only "good" seed is counted.

Thus, in order to accomplish these tasks, and thereby obtain greater accuracy than currently available seed counters, the material sensor (10) of the present invention has the ability to measure the dielectric mass of the analyte (14) passing through the measuring region (32) and thereby only counts those analytes (14) falling within a specified range of acceptable dielectric mass.

As explained above, all materials or substances have a specific dielectric constant. Additionally, all similar materials having a substantially similar density, volume and moisture content, and thus a dielectric mass, will fall within a defined range of dielectric constants (as is the case with a particular variety and type of crop seed purchased from a seed dealer). Accordingly, when planting a particular type and variety of seed, each "good" seed (14) passing through the measuring region (32) of the material sensor (10), will perturb the electromagnetic energy (30) within the measuring region (32) a certain expected amount within a quantifiable range. By providing electronic circuitry to "program" the detector (22) of the material sensor (10), to detect only those signal variations falling within an "acceptable" range, the material sensor (10) can be set to only detect "good" seed. If the signal variation of a passing analyte (14) does not fall within this predetermined range of acceptable signal variations, that analyte will not be counted by the monitor (70). In this way, dirt, chaff, seed fragments, or seeds not having at least a particular volume and mass, and thus not likely to germinate, will not be counted. Thus, the material sensor (10) of the present invention may provide a more accurate and reliable means for determining seed plant population at planting than previous types of electromagnetic material sensors, such as that disclosed in U.S. Pat. No. 4,246,469, which simply detects the passage of particles through a measuring region without any type of qualitative analysis on the particles to discern "good" seed from other debris. The type of electronic circuitry required to enable the mixer (48) to be "programmed" to only produce an output signal upon detection of a signal variation within an acceptable range is known to those skilled in the art.

3. Flow Rate or Velocity Monitoring of Individual Particles

Figure 4:
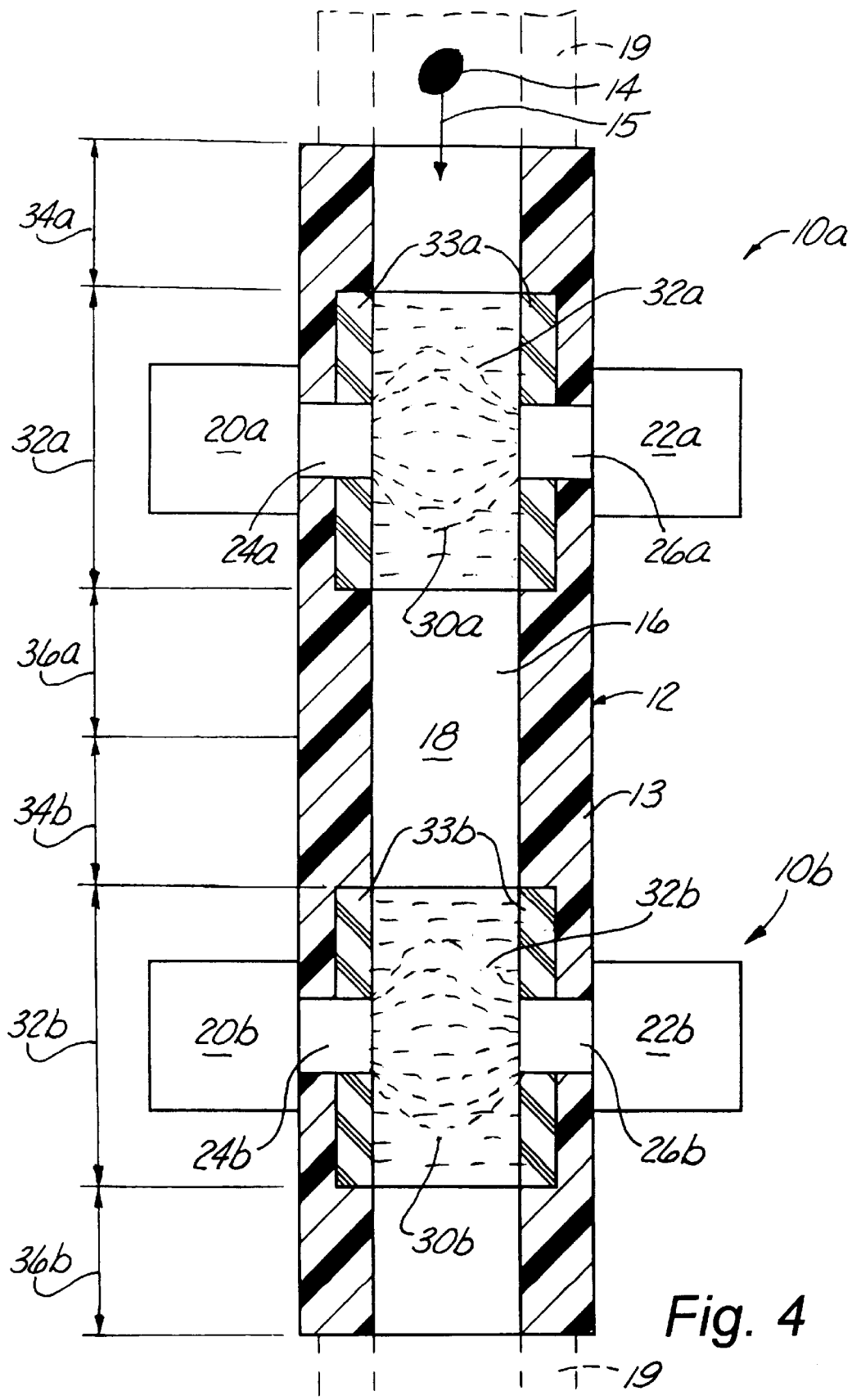
FIG. 4 is a cross-sectional view showing two non-resonant electromagnetic energy sensors of the embodiment of FIG. 1 interposed along a length of conduit.

In addition to counting individual particles, it may also be desirable to determine the velocity or flow rates of those passing analytes (14). If it is desired to detect velocity or flow rates of the analyte (14), it should be appreciated that two material sensors (10) must be interposed along the length of conduit (19) as shown in FIG. 4. By interposing two sensors (10) a known distance apart along the path of travel of the analyte (14) two response signals will be obtained. By detecting the time difference between the two response signals, and since the distance between the sensors (10) is known, the velocity and/or flow rate of the analyte (14) is easily calculated. Again, a practical use of such an application can be found in the example of the seed planter (60).

FIG. 4 illustrates the application of the present invention in which two sensors (10) are interposed along the length of conduit (19). The first sensor and its constituent components are identified by the addition of the letter "a" after each respective numerical identifier and the second sensor and its constituent components are identified by the addition of the letter "b" after each respective numerical identifier. It should be understood that when two sensors (10a, 10b)) are used, the electrical circuit (40) for the material sensors (10a, 10b) of the present invention may be the same as that shown in FIG. 2, except that the source (20) generates electromagnetic energy (30) for propagation into both the measuring regions (32a, 32b) and that the detector (22) detects the electromagnetic energy signal variations from both measuring regions (32a, 32b). Alternatively, each sensor (10a, 10b) may have its own electrical circuit (40) as shown in FIG. 2.

Figure 5:
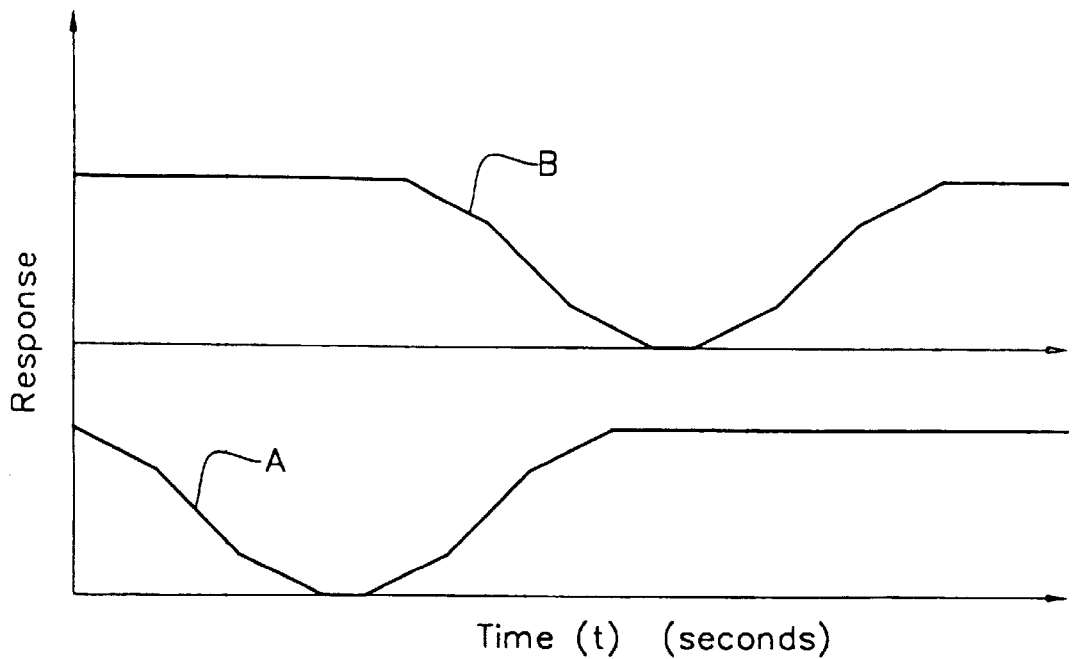
FIG. 5 shows sample output signals from the non-resonant electromagnetic energy sensors from the application of FIG. 4.
Figure 6:
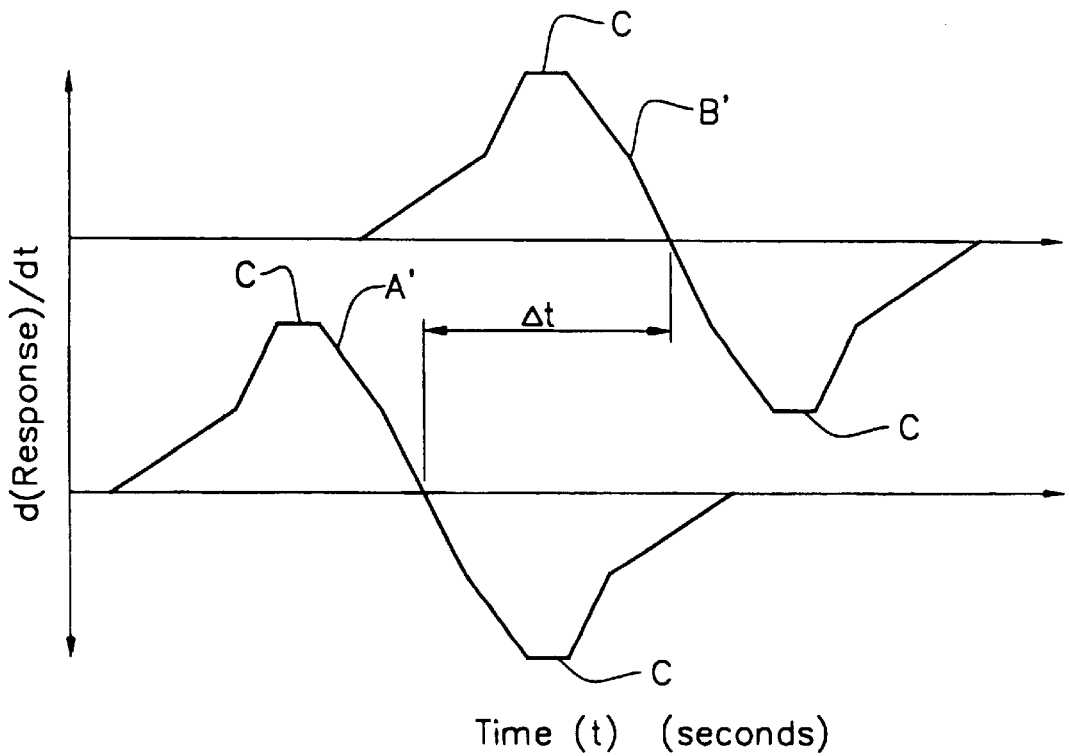
FIG. 6 shows the output signals of FIG. 5 differentiated with respect to time.

Referring concurrently to FIG. 4 and FIG. 5, the response from the first detector (22a) as the analyte (14) passes through the first measuring region (32a) may look like line "A" of FIG. 5 and the response from the second detector (22b) as the analyte (14) passes through the second measuring region (32b) may look like line "B" of FIG. 5. When the responses are differentiated with respect to time, responses like those represented by lines "A'" and "B'" of FIG. 6 would result. The central portion "C" (FIG. 6) of the response lines A' and B' would be flat for a longer time difference between the passing analyte (14). The differentiated response would then stay at zero for a period of time as well. A zero crossing detector is then used to measure the time difference "Δt" between the two measuring region responses. Because the distance between the measuring regions (32a, 32b) is known, and the time difference Δt is now known, the flow rate and/or velocity of the analyte (14) can be readily determined. The electronic circuitry required to perform these tasks and the calculations required to make these determinations is well known to those skilled in the art.

4. Flow Rate or Velocity Monitoring of Particles Flowing as a Continuum

The above example is appropriate for determining flow rates of discreet or individual particles separated by a measurable time period. However, for determining flow rates of a material or substance flowing as a continuum, autocorrelation of the two response signals from the two material sensors (10a, 10b) is preferred. A yield monitor for a combine harvester would be a specific application where monitor particles flowing as a continuum would be useful.

Figure 7:
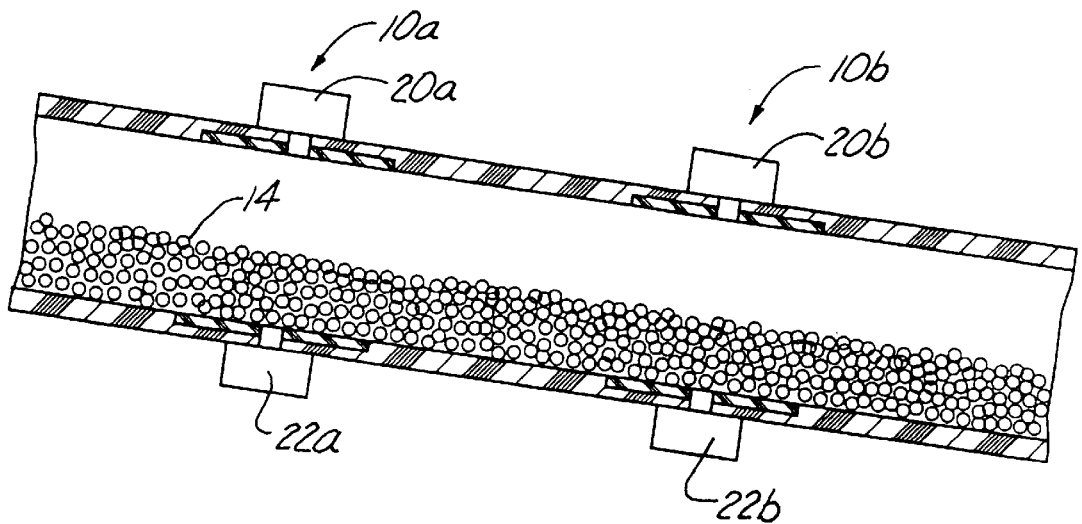
FIG. 7 is a cross-sectional view showing two non-resonant electromagnetic energy sensors of the embodiment of FIG. 1 interposed along a length of conduit in which solid analyte particles are flowing therethrough as a continuum.

Such an application is shown in FIG. 7. The sensors (10a, 10b) are interposed along a length of conduit (19) where the analyte (14) is flowing as a continuum through a conduit (19). In an application of the present invention as a yield monitor for a combine harvester, the conduit (19) may be in any location where the grain flows through a conduit, for example in the area between the paddle elevators and the grain tank fill auger.

Figure 8:
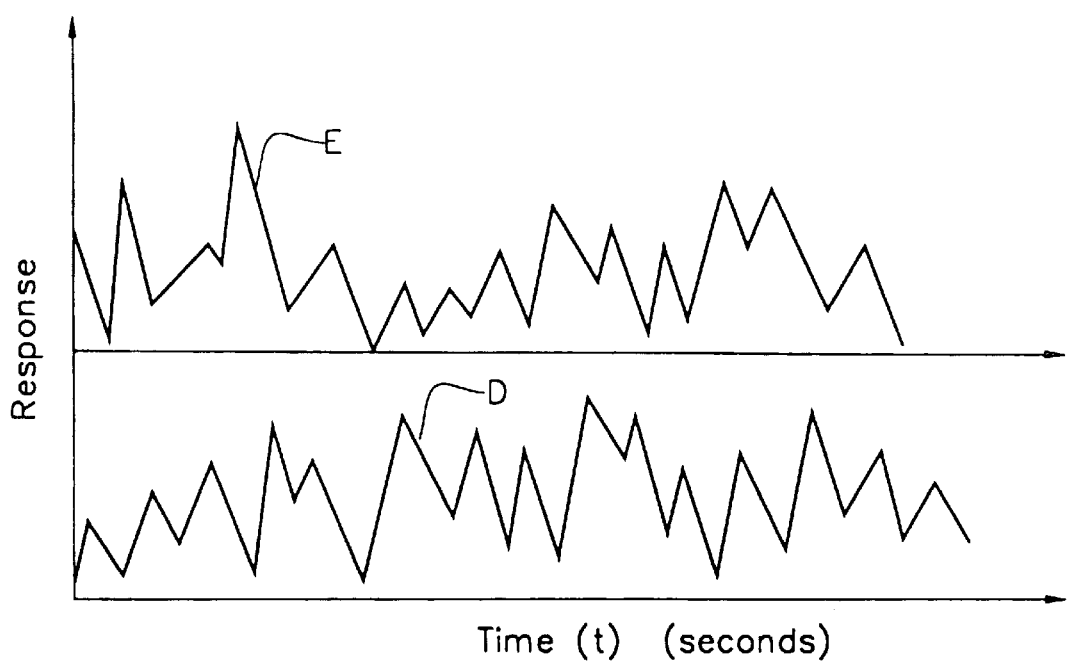
FIG. 8 shows sample output signals from the non-resonant electromagnetic energy sensors from the application of FIG. 7.
Figure 9:
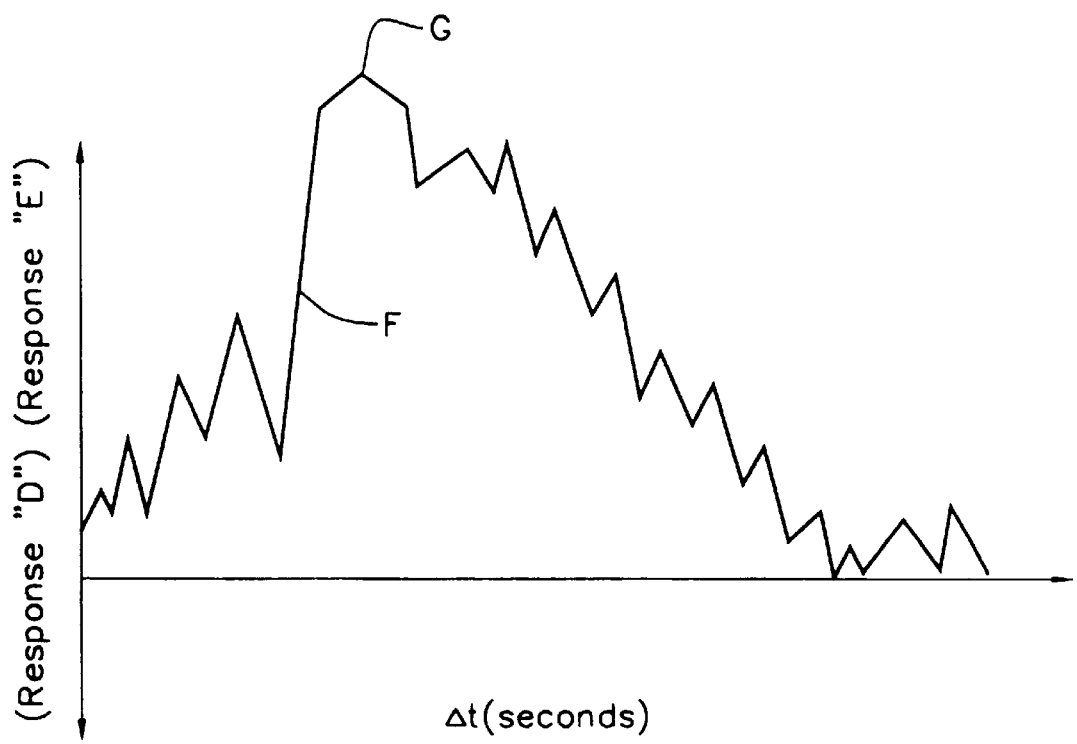
FIG. 9 shows the output signals of FIG. 8 after application of sampling and correlation techniques.

For flow rate determinations of a material or substance (14) flowing as a continuum, the response from the first detector (22a) may look like the noisy signal as indicated by line "D" in FIG. 8, whereas the response from the second detector (22b) may look like the noisy signal indicated by line "E" of FIG. 8. Using a sampling technique and a correlation technique, a signal similar to that indicated by Line "F" of FIG. 9 would result. The peak "G" (FIG. 9) of this signal would indicate the time delay between the two measuring regions (32a, 32b) and thus the flow rate. For high flow rates in which a greater volume of material passes per unit of time, the time difference would be less, whereas for lower flow rates, in which a lesser volume of material passes per unit of time, the time difference would be greater. In very low flow rates or no flow rate, there would be no discernable signal peak.

With the flow rate known, the volume of grain passing per unit of time may be readily calculated. For example, if the conduit (19) flows full at all times, the volume of the grain passing per unit of time is calculated simply by multiplying the interior volume of the conduit by the flow rate. If the conduit (19) is not flowing full at all times, one of the material sensors (10a, 10b) may be used to also monitor the dielectric mass of the grain passing through the measuring region (32a, 32b). With the dielectric mass known, the actual volume of grain passing through the measuring region (32a, 32b) is readily quantified. The actual volume is then simply multiplied by the known flow rate to obtain the volume passing per unit of time. Once the volume of grain per unit of time is obtained, the yield per acre is readily obtained by knowing the speed of the harvester and the width of the harvester. This calculated yield can then be displayed to the user on the console and/or stored in memory for later use and retrieval, such as to calculate the average yield per acre for a given field. The electronic circuitry required to perform these tasks and the calculations required to make these determinations is well known to those skilled in the art.

5. Flow Rate Monitoring of Non-Turbulent Fluids

The technique just described for determining flow rates of materials flowing as a continuum might also be used to measure flow rates of non-turbulent flow of fluid or gaseous materials. The determination of flow rates of non-turbulent fluid flow is useful, for example, in the agricultural industry for determining flow rates of aqueous mixtures such as fertilizers, herbicides or insecticides applied by a sprayer/applicators. Another example would be for monitoring the flow rates of gaseous materials under pressure such as in liquid anhydrous ammonia applicators. Yet another example would be for monitoring gaseous substances flowing through pipes, conduits or hoses.

It should be understood, however, that a volume flow rate cannot be determined directly for a fluid or gaseous substances as in the above described technique for determining volume flow rates of solid granular materials flowing as a continuum. Instead, the velocity of the fluid or gaseous substance is determined by detecting inclusions (macroscopic and/or microscopic gaseous bubbles or "dirt" particles) in the fluid or gas. Detecting these inclusions and their correlation at two different points along a flow line will result in the determination of flow velocity of the fluid or gas. Consider a set of particles tightly grouped at one point in a fluid flow. If the distribution of the particles is assumed to be Gaussian at some average value, their values might be described as:

$$D(x) = D_0 e^{-\frac{1}{2}\frac{(x-x_0)^2}{\sigma^2}}$$

At a later period in time, these same number of particles will be found at some other location. The distribution at this later or second period in time might be described as:

$$D(x) = D_0' e^{-\frac{1}{2}\frac{(x-x_0')^2}{\sigma'^2}}$$

The primed values stand for constants in the distribution at the second period in time. It would be expected that the distribution would have "spread" and that σ' would relate to a distribution which is spread out. When the standard deviation σ is small, the distribution is "sharp". When σ is large, the distribution is spread out. Sampling this distribution of particles as they flow past the two measuring regions (32a, 32b) will produce a digital representation of the number of particles versus time. Depending on the flow rate, the number of particles in the distribution may be counted more than once. However, the shape of the distribution is important. If the sampling rate is too small, only the total number of particles would be counted if they happen to be in the measurement region at that time. As the sampling rate increases, a point will be reached when the distribution will be adequately measured and the average of the distribution can be detected. The average at some time later, even though the distribution has spread would also be detected and a flow rate determined from that. When the distribution is "continuous", then one looks for fine structure in the distribution and cross correlates to measurements to determine the time of flow between the two measuring regions (32a, 32b).

Once the flow velocity is obtained one can then determine volume flow, such as in gallons or liters per unit of time, by simply multiplying the cross-sectional area of the flowing fluid or gas by the flow velocity of the fluid. If the measuring region (32) is flowing full at all times, such as with a liquid under pressure or a gaseous substance, the area of the measuring region is equal to the cross-sectional area of the flowing fluid or gas. If the measuring region (32) is not flowing full, the dielectric volume of the flowing substance may be determined as explained below, this dielectric volume may be used to calculate the actual volume of material passing per unit of time.

Figure 10:
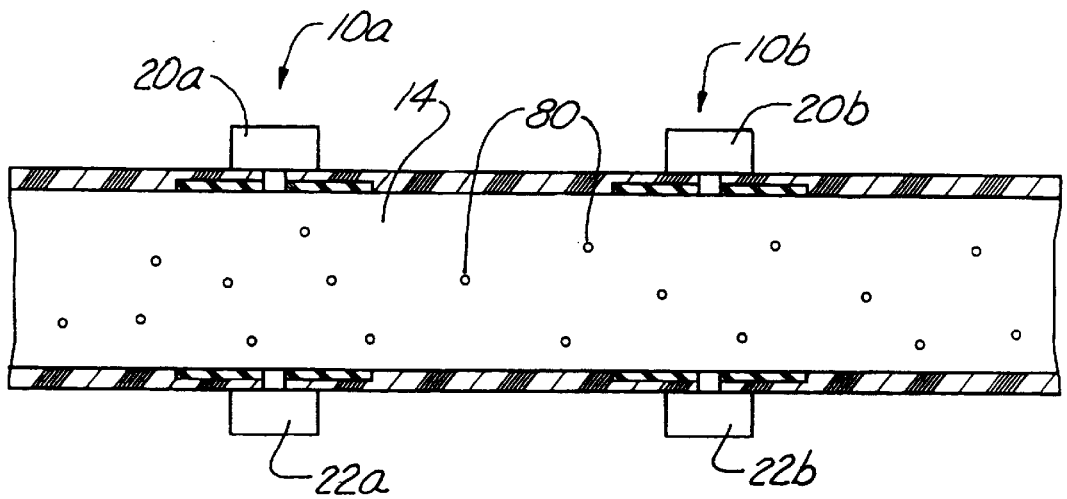
FIG. 10 is a cross-sectional view showing two non-resonant electromagnetic energy sensors of the embodiment of FIG. 1 interposed along a length of conduit in which a liquid or gaseous analyte fluid is flowing therethrough.

In practice, first and second material sensors (10a, 10b) must be interposed in the conduit (19) along the path of travel of the fluid or gaseous analyte substance (14) as shown in FIG. 10. As the analyte (14) passes the material sensors (10a, 10b), each will produce a response signal proportional to the dielectric volume, the magnetic volume, or the conducting volume of the analyte (14). By measuring both the magnitude of the response of each sensor (10a, 10b) and the time delay between the responses of the two sensors (10a, 10b) the velocity of the inclusions (80) in the fluid or gaseous substance (14), and thus the velocity of the fluid or gas (14) itself can be determined and then converted to volume flow rate as described above. The electronic circuitry required to perform these tasks and the calculations required to make these determinations is well known to those skilled in the art.

Additionally, those skilled in the art will recognize that modifications of these circuits can be made to incorporate modulation of amplitude and/or phase on the carrier of the signals so that time delays used on the signals effect the same result as a delay in the detected signals. The effective modulation time delays can be varied to give a correlation peak without having to delay the sensed signal phase delay.

Figure 11:
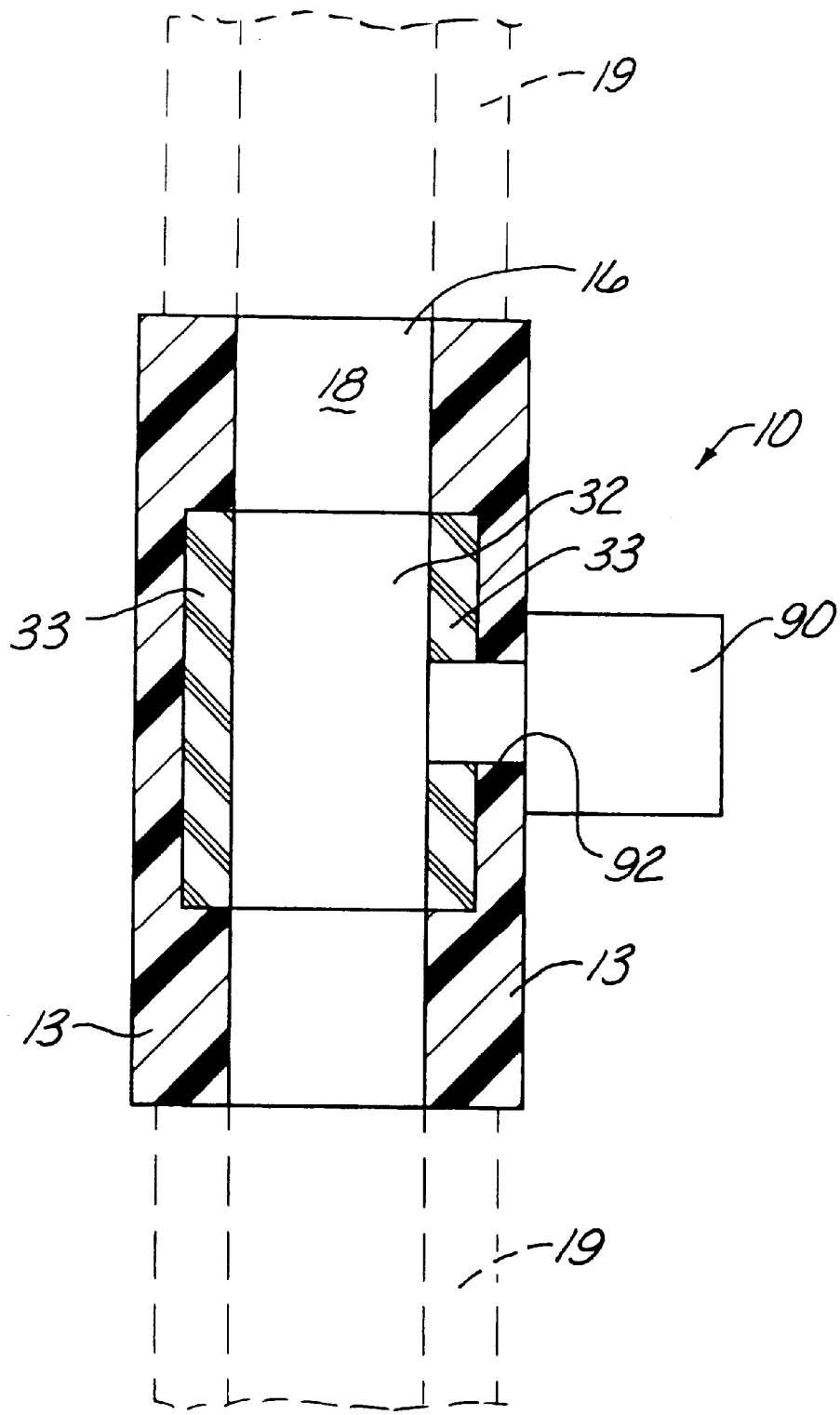
FIG. 11 is a cross-sectional view of another embodiment of the non-resonant electromagnetic energy sensor of the present invention interposed along a length of conduit which utilizes Doppler techniques.

6. Flow Rate Determinations of Substances Flowing as a Continuum Using the Doppler Technique Another embodiment for determining flow rates of solid, liquid, or gaseous substances flowing as a continuum is shown in FIG. 11. Notice with the Doppler technique only one sensor (10) is required as opposed to two sensors for the other above described techniques for determining flow rates. Additionally, a single diode (90) extends through a single port (92) in the wall members (13) of the chamber (16), the single diode (90) acting as both the electromagnetic energy source (24) and electromagnetic energy detector (26). With the Doppler technique, the signal that leaves the area of the sensor returns from the flowing material shifted in frequency. The mixer (48) receiving this frequency shifted return signal will now produce an output signal at a frequency that is equal to this shift of frequency between the transmitted signal and the received signal. The low frequency signal will be related to the velocity of the material being detected and thus related to the flow rate.

The transmitted signal will have a substantial reflection coefficient. Then this return signal is electrically mixed with the incident signal. The resulting signal difference frequency is filtered out of the detector and is indicative of the velocity of the material. The electronic circuitry required to perform these tasks and the calculations required to make these determinations is well known to those skilled in the art.

Although only exemplary embodiments of the present invention and various applications therefor have been described in detail above, those skilled in the art will readily appreciate that many modifications are possible without materially departing from the novel teachings and advantages of this invention and its various applications. Accordingly, all such modifications are intended to be included within the scope of this invention as defined in the following claims.

We claim:

1. A non-resonant electromagnetic energy sensor comprising:
   (a) housing having wall members surrounding a path of travel of an analyte, said wall members defining a chamber having an interior volume for passage of said analyte therethrough, at least a portion of said chamber including at least one measuring region defined by a dielectric region disposed between evanscent regions;
   (b) a non-resonant electromagnetic energy circuit, said circuit comprising:
      (i) a voltage source;
      (ii) a voltage regulator;
      (iii) at least one electromagnetic energy source in communication with said interior volume of at least one of said measuring regions, said a least one electromagnetic energy source generating electromagnetic energy having electrical and magnetic components of non-equal total peak values;
      (iv) at least one electromagnetic energy detector in communication with said interior volume of at least one of said measuring regions, said at least one electromagnetic energy detector producing an output signal upon detection of signal variations in said electromagnetic energy within at least one of said measuring regions caused by passage of said analyte therethrough.

2. The non-resonant electromagnetic energy sensor of claim 1 wherein said at least one electromagnetic energy source and said at least one electromagnetic energy detector is at least one single diode acting as both said at least one electromagnetic energy source and said at least one electromagnetic energy detector.

3. The non-resonant electromagnetic energy sensor of claim 1 wherein said non-resonant electromagnetic energy circuit further includes a buffer amplifier.

4. The non-resonant electromagnetic energy sensor of claim 3 wherein said non-resonant electromagnetic energy circuit further includes a signal processor.

5. The non-resonant electromagnetic energy sensor of claim 4 wherein said generated electromagnetic energy has a frequency of at least 10 megahertz.

6. A planter monitoring system for use with a conventional row crop planter, said planter of the type having at least one conduit defining a path of travel through to the soil for dispensing solid granular analyte particles thereon, said monitoring system comprising:
   (a) a non-resonant electromagnetic energy sensor interposed in said at least one conduit along the path of travel of said analytes therethrough, said non-resonant electromagnetic energy sensor comprising:
      (i) a housing having wall members surrounding said path of travel of said analyte, said wall members defining a chamber having an interior volume for passage of said analyte therethrough, at least a portion of said chamber including at least one measuring region defined by a dielectric region disposed between evanscent regions;
      (ii) a non-resonant electromagnetic energy circuit, said circuit comprising:
         (A) a voltage source;
         (B) a voltage regulator;
         (C) at least one electromagnetic energy source in communication with said interior volume of at least one of said measuring region, said electromagnetic energy source generating electromagnetic energy having electrical and magnetic components of non-equal total peak values;
         (D) at least one electromagnetic energy detector in communication with said interior volume of said at least one measuring region, said electromagnetic energy detector producing an output signal upon detection of signal variations in said electromagnetic energy within at least one of said measuring region caused by passage of said analyte therethrough;
   (b) a monitor interfacing with said non-resonant electromagnetic energy sensor, said monitor being electronically responsive to said output signals from said at least one electromagnetic energy detector.

7. The planter monitoring system of claim 6 wherein said monitor includes indicators for visually indicating said analyte flow through said at least one measuring region.

8. The planter monitoring system of claim 6 wherein said monitor includes indicators for audibly indicating said analyte flow through said at least one measuring region.

9. The planter monitoring system of claim 6 wherein said monitor includes a counter to count the passage of said analytes passing through said at least one measuring region.

10. The planter monitoring system of claim 6 wherein said system includes electronic circuitry programed to control said electromagnetic energy detector to output signals only when said detected signal variations fall within a predetermined range of acceptable signal variations.

11. A flow rate monitoring system for monitoring flow rates of discrete solid granular analyte particles through a conduit, said flow rate monitoring system comprising:
   (a) a non-resonant electromagnetic energy sensor interposed in said conduit along the path of travel of said analytes therethrough, said non-resonant electromagnetic energy sensor comprising:

(i) a housing having wall members surrounding said path of travel of said analytes, said wall members defining a chamber having an interior volume for passage of said analyte therethrough, at least a portion of said chamber including a first measuring region and a second measuring region at a predetermined spaced distance, said first and second measuring regions defined by a dielectric region disposed between evanscent regions;

(ii) a non-resonant electromagnetic energy circuit, said circuit comprising:

(A) a voltage source;

(B) a voltage regulator;

(C) at least one electromagnetic energy source in communication with said interior volume of said first and second measuring regions, said at least one electromagnetic energy source generating electromagnetic energy within said first and second measuring regions having electrical and magnetic components of non-equal total peak values;

(D) at least one electromagnetic energy detector in communication with said interior volume of said first and second measuring regions, said at least one electromagnetic energy detector producing an output signal upon detection of signal variations of said electromagnetic energy within said first and second measuring regions caused by passage of said analyte therethrough;

(b) a monitor interfacing with said non-resonant electromagnetic energy sensor, said monitor being electronically responsive to said output signals from said at least one electromagnetic energy detector.

12. The flow rate monitoring system of claim 11 wherein said system further includes electronic circuitry programmed to receive said output signals from said at least one electromagnetic energy detector, said programmed electronic circuitry further including circuitry for detecting a time delay between said output signals whereby said analyte flow rate is determined by dividing said predetermined spaced distance of said first and second measuring regions by said time difference.

13. A flow rate monitoring system for monitoring flow rates of solid granular analyte particles flowing as a continuum through a conduit, said flow rate monitoring system comprising:

(a) a non-resonant electromagnetic energy sensor interposed in said conduit along the path of travel of said analytes therethrough, said non-resonant electromagnetic energy sensor comprising:

(i) a housing having wall members surrounding said path of travel of said analytes, said wall members defining a chamber having an interior volume for passage of said analyte therethrough, at least a portion of said chamber including a first measuring region and a second measuring region at a predetermined spaced distance, said first and second measuring regions defined by a dielectric region disposed between evanscent regions;

(ii) a non-resonant electromagnetic energy circuit, said circuit comprising:

(A) a voltage source;

(B) a voltage regulator;

(C) at least one electromagnetic energy source in communication with said interior volume of said first and second measuring regions, said at least one electromagnetic energy source generating electromagnetic energy within each of said first and second measuring regions having electrical and magnetic components of non-equal total peak values;

(D) at least one electromagnetic energy detector in communication with said interior volume of said first and second measuring regions, said at least one electromagnetic energy detector producing an output signal upon detection of signal variations of said electromagnetic energy within each of said first and second measuring regions caused by passage of said analyte therethrough;

(b) a monitor interfacing with said non-resonant electromagnetic energy sensor, said monitor being electronically responsive to said output signals from said at least one electromagnetic energy detector.

14. The flow rate monitoring system of claim 13 wherein said system further includes electronic circuitry programmed to receive said output signals from said at least one electromagnetic energy detector, said programmed electronic circuitry further including circuitry for detecting a time delay between said output signals whereby said analyte continuum flow rate is determined by dividing said predetermined spaced distance of said first and second measuring regions by said time difference.

15. The flow rate monitoring system of claim 14 wherein said system is a yield monitor for a harvester, wherein said yield monitor further include circuitry to calculate yield based on said analyte continuum flow rate.

16. A volume flow rate monitoring system for monitoring volume flow rates of non-turbulent fluids through a conduit, said fluid having inclusions therein, said flow rate monitoring system comprising:

(a) a non-resonant electromagnetic energy sensor interposed in said conduit along the path of travel of said fluid therethrough, said non-resonant electromagnetic energy sensor comprising:

(i) a housing having wall members surrounding said path of travel of said fluid, said wall members defining a chamber having an interior volume for passage of said fluid therethrough, at least a portion of said chamber including a first measuring region and a second measuring region at a predetermined spaced distance, said first and second measuring regions defined by a dielectric region disposed between evanscent regions;

(ii) a non-resonant electromagnetic energy circuit, said circuit comprising:

(A) a voltage source;

(B) a voltage regulator;

(C) at least one electromagnetic energy source in communication with said interior volume of said first and second measuring regions, said at least one electromagnetic energy source generating electromagnetic energy within said first and second measuring regions having electrical and magnetic components of non-equal total peak values;

(D) at least one electromagnetic energy detector in communication with said interior volume of said first and second measuring regions, said at least one electromagnetic energy detector producing an output signal upon detection of signal variations of said electromagnetic energy within each of said first and second measuring regions caused by passage of said inclusions in said fluid therethrough;

(b) a monitor interfacing with said non-resonant electromagnetic energy sensor, said monitor being electronically responsive to said output signals from said at least one electromagnetic energy detector.

17. The volume flow rate monitoring system of claim 16 wherein said system further includes electronic circuitry programmed to receive said output signals from said at least one electromagnetic energy detector, said programmed electronic circuitry further including circuitry for detecting a time delay between said output signals, whereby a velocity of said inclusions is determined by dividing said predetermined spaced distance of said first and second measuring regions by said time difference, said volume flow rate determined by multiplying said inclusion velocity by a volume of said non-turbulent fluid in one of said first and second measuring regions.

18. The flow rate monitoring system of claim 17 wherein said system is used on a sprayer/applicator.

19. The flow rate monitoring system of claim 17 wherein said system is used on an anhydrous ammonia applicator.

20. A flow rate monitoring system for determining flow rates of solid, liquid or gaseous analyte flowing as a continuum using Doppler techniques, said monitoring system comprising:
  (a) a non-resonant electromagnetic energy sensor interposed in said conduits along the path of travel of said analytes therethrough, said non-resonant electromagnetic energy sensor comprising:
    (i) a housing having wall members surrounding said path of travel of said analyte, said wall members defining a chamber having an interior volume for passage of said analyte therethrough, at least a portion of said chamber including at least one measuring region defined by a dielectric region disposed between evanscent regions;
    (ii) a non-resonant electromagnetic energy circuit, said circuit comprising:
      (A) a voltage source;
      (B) a voltage regulator;
      (C) at least one electromagnetic energy source in communication with said interior volume of said at least one measuring region, said at least one electromagnetic energy source generating a transmit signal of electromagnetic energy at first frequency having electrical and magnetic components of non-equal total peak values;
      (D) at least one electromagnetic energy detector in communication with said interior volume of said at least one measuring region, said at least one electromagnetic energy detector receiving a return signal having a second frequency resulting from a shift in frequency of said transmitted signal returning from said flowing analyte, said electromagnetic energy detector producing an output signal at a third frequency equal to the shift of frequency between said transmitted signal and said return signal;
  (b) a monitor interfacing with said non-resonant electromagnetic energy sensor, said monitor being electronically responsive to said output signals from said at least one electromagnetic energy detector.

21. The flow rate monitoring system of claim 20 wherein said system further includes electronic circuitry programmed to receive said output signals from said at least one electromagnetic energy detector and circuitry for converting said output signal having said third frequency to a velocity of said substance and circuitry for converting said velocity to a flow rate.

* * * * *